United States Patent
Császár et al.

(10) Patent No.: US 9,736,061 B2
(45) Date of Patent: *Aug. 15, 2017

(54) ENHANCEMENTS TO PIM FAST RE-ROUTE WITH UPSTREAM ACTIVATION PACKETS

(71) Applicant: Telefonaktiebolaget L M Ericsson (publ), Stockholm (SE)

(72) Inventors: András Császár, Telki (HU); Evgeny Tantsura, Palo Alto, CA (US); Gábor Sándor Enyedi, Békéscsaba (HU)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/543,528

(22) Filed: Nov. 17, 2014

(65) Prior Publication Data

US 2015/0071055 A1 Mar. 12, 2015

Related U.S. Application Data

(63) Continuation of application No. 13/486,651, filed on Jun. 1, 2012, now Pat. No. 8,913,482.

(51) Int. Cl.
*H04L 12/703* (2013.01)
*H04L 12/761* (2013.01)
(Continued)

(52) U.S. Cl.
CPC ............ *H04L 45/28* (2013.01); *H04L 12/18* (2013.01); *H04L 45/16* (2013.01); *H04L 45/22* (2013.01)

(58) Field of Classification Search
CPC .......... H04L 45/16; H04L 45/28; H04L 45/22
See application file for complete search history.

(56) References Cited

U.S. PATENT DOCUMENTS

| 7,660,235 B2 | 2/2010 | Alicherry et al. |
| 8,102,848 B1 | 1/2012 | Rao |

(Continued)

FOREIGN PATENT DOCUMENTS

| EP | 2134031 A1 | 12/2009 |
| EP | 2592793 | 5/2013 |

(Continued)

OTHER PUBLICATIONS

Karan et al., Multicast only Fast Re-Route, draft-karan-mofrr-01, 14 pages, Mar. 13, 2011.*

(Continued)

*Primary Examiner* — Khaled Kassim
*Assistant Examiner* — Zhaohui Yang
(74) *Attorney, Agent, or Firm* — Nicholson, De Vos, Webster & Elliot, LLP

(57) ABSTRACT

A method performed by a network node. The method includes detecting a loss of connection at an incoming interface to an upstream neighbor of the network node, where the network node is in a multicast communication network that includes a multicast tree to provide connectivity from a common source node to one or more multicast recipient nodes. The multicast communication network further includes a set of one or more secondary paths to provide redundancy to the multicast tree, and sending a notification packet downstream toward the one or more multicast recipient nodes when the network node cannot re-route the multicast data traffic to allow the multicast data traffic to be received by the multicast recipient nodes, wherein the notification packet causes one or more downstream nodes to switch multicast reception to one or more of the set of one or more secondary paths to re-route the multicast data traffic.

24 Claims, 9 Drawing Sheets

(51) Int. Cl.
H04L 12/707 (2013.01)
H04L 12/18 (2006.01)

(56) References Cited

U.S. PATENT DOCUMENTS

| | | | |
|---|---|---|---|
| 8,510,551 B1* | 8/2013 | Desai et al. | 713/163 |
| 8,638,659 B2 | 1/2014 | Csaszar et al. | |
| 8,824,276 B2 | 9/2014 | Csaszar | |
| 8,913,482 B2 | 12/2014 | Csaszar et al. | |
| 9,197,547 B2 | 11/2015 | Csaszar | |
| 2002/0186652 A1* | 12/2002 | Popovich | 370/218 |
| 2005/0111351 A1 | 5/2005 | Shen | |
| 2006/0159009 A1 | 7/2006 | Kim et al. | |
| 2006/0209826 A1 | 9/2006 | Kawamura | |
| 2007/0237072 A1 | 10/2007 | Scholl | |
| 2007/0237085 A1 | 10/2007 | Tirumalai et al. | |
| 2007/0253416 A1 | 11/2007 | Raj | |
| 2008/0031130 A1* | 2/2008 | Raj et al. | 370/225 |
| 2008/0056123 A1 | 3/2008 | Howard et al. | |
| 2008/0107017 A1 | 5/2008 | Yuan et al. | |
| 2009/0201803 A1 | 8/2009 | Filsfils et al. | |
| 2009/0252033 A1 | 10/2009 | Ramakrishnan et al. | |
| 2009/0303996 A1* | 12/2009 | Takase et al. | 370/390 |
| 2010/0014528 A1 | 1/2010 | Amir et al. | |
| 2010/0251037 A1* | 9/2010 | Cao | H04L 41/06 714/57 |
| 2011/0019534 A1 | 1/2011 | Ramakrishnan et al. | |
| 2011/0063973 A1* | 3/2011 | VenkataRaman | H04L 12/1877 370/228 |
| 2011/0110224 A1 | 5/2011 | Nakash | |
| 2011/0158082 A1 | 6/2011 | Barkai et al. | |
| 2012/0020207 A1 | 1/2012 | Corti et al. | |
| 2012/0033672 A1* | 2/2012 | Page et al. | 370/395.53 |
| 2012/0039164 A1* | 2/2012 | Enyedi et al. | 370/217 |
| 2014/0355422 A1 | 12/2014 | Csaszar et al. | |
| 2015/0172070 A1 | 6/2015 | Csaszar | |

FOREIGN PATENT DOCUMENTS

| | | |
|---|---|---|
| JP | 2006229740 A | 8/2006 |
| JP | 2009296493 A | 12/2009 |
| JP | 2010045732 A | 2/2010 |
| WO | WO-2005018175 | 2/2005 |
| WO | WO-2012003743 | 1/2012 |

OTHER PUBLICATIONS

Allan et al., "A Framework for Multi-Protocol Label Switching (MPLS) Operations and Management (OAM)", RFC 4378, Feb. 2006.*
Non-Final Office Action, U.S. Appl. No. 13/486,470, dated Dec. 3, 2013, 15 pages.
Non-Final Office Action, U.S. Appl. No. 13/486,651, dated Jan. 14, 2014, 28 pages.
Notice of Allowance, U.S. Appl. No. 13/486,470, dated Apr. 17, 2014, 9 pages.
Final Office Action, U.S. Appl. No. 13/486,651, dated Jun. 4, 2014, 26 pages.
Notice of Allowance U.S. Appl. No. 13/486,651, dated Aug. 14, 2014, 8 pages.
Notice of Allowance, U.S. Appl. No. 13/486,472, dated Sep. 18, 2013, 10 pages.
Atlas, A. , et al., "An Architecture for IP/LDP Fast-Reroute Using Maximally Redundant Trees", draft-atlas-rtqwq-mrt-frr-architecture-01, Oct. 31, 2011, 26 pages, Routing Area Working Group.
Fei, Aiguo , et al., "A "Dual-Tree" Scheme for Fault-Tolerant Multicast", 2001, 5 pages, IEEE.
Fenner, B. , et al., "Protocol Independent Multicast-Sparse Mode (PIM-SM): Protocol Specification (Revised)", IETF,, RFC4601, Aug. 2006, 112 pages.
Karan, A. , et al., "Multicast only Fast Re-Route draft-karan-mofrr-02", http://www.ietf.org/id/draft-karan-mofrr-02.txt, Mar. 9, 2012, 15 pages.

Rescorla, E., , "TLS Elliptic Curve Cipher Suites with SHA-256/384 and AES Galois Counter MOe (CGM)", Network Working Group, Aug. 2008, 6 pages.
Shand, M. , et al., "IP Fast Reroute Framework", Internet Engineering Task Force (IETF), Jan. 2010, 15 pages.
Wijnands, IJ. , et al., "Tree Notification to Improve Multicast Fast Reroute, draft-wijnands-rtgwg-mcast-frr-tn-00", Oct. 15, 2012, 17 pages, Routing Working Group, Internet-Draft, IETF Trust and the persons identified as the document authors.
Fenner, B., et al., "Protocol Independent Multicast-Sparse Mode (PIM-SM): Protocol Specification (Revised)," Aug. 2006, 112 pages, Network Working Group, Request for Comments: 4601, The Internet Society.
Rescorla, E., "TLS Elliptic Curvce Cipher Suites with SHA-256/384 and AES Galois Counter Mode (GCM)", Aug. 2008, 6 pages, Network Working Group, Request for Comments: 5289.
Shand, M., et al., "IP Fast Reroute Framework", Jan. 2010, 15 pages, Internet Engineering Task Force (IETF), Request for Comments: 5714.
Notice of Allowance, U.S. Appl. No. 14/333,327, dated Oct. 5, 2015, 12 pages.
Non-Final Office Action, U.S. Appl. No. 14/333,327, dated Feb. 3, 2015, 9 pages.
Non-Final Office Action, U.S. Appl. No. 14/333,327, dated May 4, 2015, 6 pages.
RFC 768: Postel, "User Datagram Protocol," Aug. 28, 1980, 3 pages, Network Working Group, Request for Comments: 768.
RFC 793: "Transmission Control Protocol, DARPA Internet Program Protocol Specification," Sep. 1981, 91 pages, Network Working Group, Request for Comments: 793.
RFC 1058: Hedrick, "Routing Information Protocol," Jun. 1988, 33 pages, Network Working Group, Request for Comments: 1058.
RFC 1142: Oran, "OSI IS-IS Intra-domain Routing Protocol," Feb. 1990, 157 pages, Network Working Group, Request for Comments: 1142.
RFC 1180: Socolofsky, et al., "A TCP/IP Tutorial," Jan. 1991, 28 pages, Network Working Group, Request for Comments: 1180.
RFC 2080: Malkin, et al., "RIPng for IPv6," Jan. 1997, 19 pages, Network Working Group, Request for Comments: 2080.
RFC 2205: Braden, et al., "Resource ReSerVation Protocol (RSVP)—Version 1 Functional Specification," Sep. 1997, 112 pages, Network Working Group, Request for Comments: 2205.
RFC 2210: Wroclawski, "The Use of RSVP with IETF Integrated Services," Sep. 1997, 33 pages, Network Working Group, Request for Comments: 2210.
RFC 2211: Wroclawski, "Specification of the Controlled-Load Network Element Service," Sep. 1997, 19 pages, Network Working Group, Request for Comments: 2211.
RFC 2212: Shenker, et al., "Specification of Guaranteed Quality of Service," Sep. 1997, 20 pages, Network Working Group, Request for Comments: 2212.
RFC 2328: Moy, "OSPF Version 2," Apr. 1998, 244 pages, Network Working Group, Request for Comments: 2328, The Internet Society.
RFC 2453: Malkin, "RIP Version 2," Nov. 1998, 39 pages, Network Working Group, Request for Comments: 2453, The Internet Society.
RFC 2460: Deering, et al., "Internet Protocol, Version 6 (IPv6) Specification," Dec. 1998, 39 pages, Network Working Group, Request for Comments: 2460, The Internet Society.
RFC 2474: Nichols, et al., "Definition of the Differentiated Services Field (DS Field) in the IPv4 and IPv6 Headers," Dec. 1998, 20 pages, Network Working Group, Request for Comments: 2474, The Internet Society.
RFC 2475: Blake, et al., "An Architecture for Differentiated Services," Dec. 1998, 36 pages, Network Working Group, Request for Comments: 2475, The Internet Society.
RFC 2597: Heinanen, et al., "Assured Forwarding PHB Group," Jun. 1999, 11 pages, Network Working Group, Request for Comments: 2597, The Internet Society.
RFC 2675: Borman, et al., "IPv6 Jumbograms," Aug. 1999, 9 pages, Network Working Group, Request for Comments: 2675, The Internet Society.

(56) References Cited

OTHER PUBLICATIONS

RFC 2983: Black, "Differentiated Services and Tunnels," Oct. 2000, 14 pages, Network Working Group, Request for Comments: 2983, The Internet Society.
RFC 3086: Nichols, et al., "Definition of Differentiated Services Per Domain Behaviors and Rules for their Specification," Apr. 2001, 24 pages, Network Working Group, Request for Comments: 3086, The Internet Society.
RFC 3140: Black, et al., "Per Hop Behavior Identification Codes," Jun. 2001, 8 pages, Network Working Group, Request for Comments: 3140, The Internet Society.
RFC 3209: Awduche, et al., "RSVP-TE: Extensions to RSVP for LSP Tunnels," Dec. 2001, 61 Pages, Network Working Group, Request for Comments: 3209, The Internet Society.
RFC 3246: Davie, et al., "An Expedited Forwarding PHB (Per-Hop Behavior)," Mar. 2002, 16 pages, Network Working Group, Request for Comments: 3246, The Internet Society.
RFC 3247: Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
RFC 3260: Grossman, "New Terminology and Clarifications for Diffserv," Apr. 2002, 10 pages, Network Working Group, Request for Comments: 3260, The Internet Society.
RFC 3289: Baker, et al., "Management Information Base for the Differentiated Services Architecture," May 2002, 116 pages, Network Working Group, Request for Comments: 3289, The Internet Society.
RFC 3290: Bernet, et al., "An Informal Management Model for Diffserv Routers," May 2002, 56 pages, Network Working Group, Request for Comments: 3290, The Internet Society.
RFC 3317: Chan, et al., "Differentiated Services Quality of Service Policy Information Base," Mar. 2003, 96 pages, Network Working Group, Request for Comments: 3317, The Internet Society.
RFC 3473: Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.
RFC 3936: Kompella, et al., "Procedures for Modifying the Resource reSerVation Protocol (RSVP)," Oct. 2004, 7 pages, Network Working Group, Request for Comments: 3936, The Internet Society.
RFC 4113: Fenner, et al., "Management Information Base for the User Datagram Protocol (UDP)," Jun. 2005, 19 pages, Network Working Group, Request for Comments: 4113, The Internet Society.
RFC 4271: Rekhter, et al., "A Border Gateway Protocol 4 (BGP-4)," Jan. 2006, 104 pages, Network Working Group, Request for Comments: 4271, The Internet Society.
RFC 4301: Kent, et al., "Security Architecture for the Internet Protocol," Dec. 2005, 101 pages, Network Working Group, Request for Comments: 4301, The Internet Society.
RFC 4309: Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
RFC 4364: Rosen, et al., "BGP/MPLS IP Virtual Private Networks (VPNs)," Feb. 2006, 47 pages, Network Working Group, Request for Comments: 4364, The Internet Society.
RFC 4495: Polk, et al., "A Resource Reservation Protocol (RSVP) Extension for the Reduction of Bandwidth of a Reservation Flow," May 2006, 21 pages, Network Working Group, Request for Comments: 4495, The Internet Society.
RFC 4558: Ali, et al., "Node-ID Based Resource Reservation Protocol (RSVP) Hello: A Clarification Statement," Jun. 2006, 7 pages, Network Working Group, Request for Comments: 4558, The Internet Society.
RFC 4594: Babiarz, et al., "Configuration Guidelines for DiffServ Service Classes," Aug. 2006, 57 pages, Network Working Group, Request for Comments: 4594, The Internet Society.
RFC 5036: Andersson, et al., "LDP Specification," Oct. 2007, 135 pages, Network Working Group, Request for Comments: 5036, The IETF Trust.
RFC 5340: Coltun, et al., "OSPF for IPv6," Jul. 2008, 94 pages, Network Working Group, Request for Comments: 5340, The IETF Trust.
RFC 5405: Eggert, et al., "Unicast UDP Usage Guidelines for Application Designers," Nov. 2008, 27 pages, Network Working Group, Request for Comments: 5405, IETF Trust and the persons identified as the document authors.
RFC 5865: Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.
RFC 7431: Karan, et al., "Multicast-Only Fast Reroute," Internet Engineering Task Force (IETF), Request for Comments, Aug. 2015, 14 pages.

* cited by examiner (R1) IF A NODE RECEIVES A DFNP FROM ITS PRIMARY UMH AND HAS A FAILURE-FREE SECONDARY PATH, THE NODE IS A REPAIR NODE. THE REPAIR NODE DOES NOT FORWARD THE DFNP AND IS TO UNBLOCK THE SECONDARY PATH TO ITS SECONDARY UMH.
411

(R2) IF A NODE RECEIVES A DFNP FROM ITS PRIMARY UMH BUT DOES NOT HAVE A SECONDARY UMH, THE NODE IS NOT A REPAIR NODE. THIS NODE IS TO FORWARD THE DFNP TO ALL OF ITS DOWNSTREAM NODES
412

(R3) IF A NODE RECEIVES TWO DFNPS FROM TWO INCOMING PATHS, THIS NODE IS NOT A REPAIR NODE. THE NODE IS TO FORWARD ONE OF THE DFNPS TO ALL OF THE DOWNSTREAM NODES AND DOES NOT FORWARD THE OTHER DFNP.
413

(R4) A DFNP RECEIVED ONLY FROM THE SECONDARY UMH OF A NODE IS TO BE DISCARDED
414

FIG. 4A

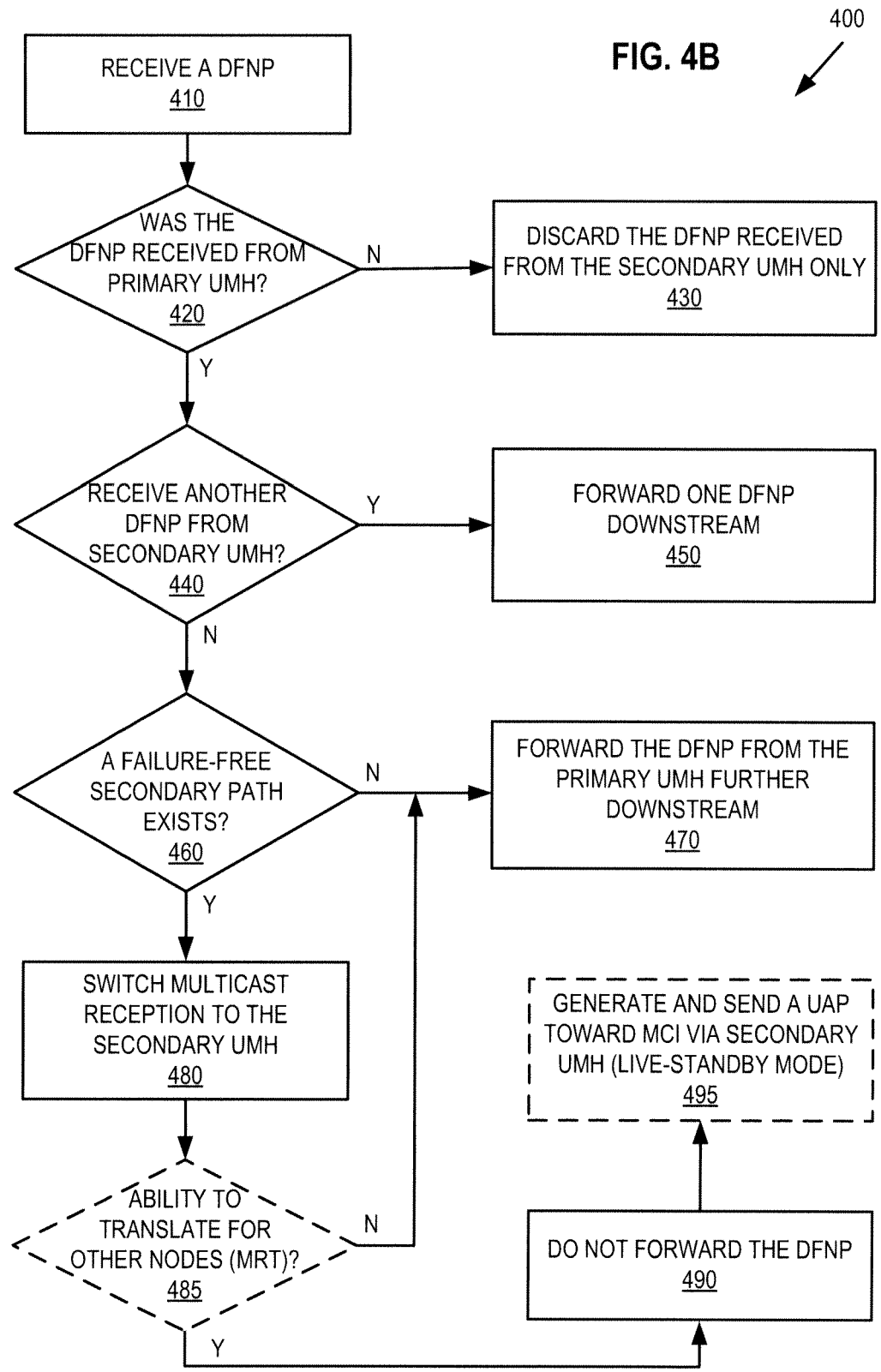

FORWARDING TABLES 710

| NODE B | BLUE | RED (A) | RED (B) |
|---|---|---|---|
| INCOMING IFs 710 | C | A | A |
| OUTGOING IFs 720 | A | C | (C) |

| NODE C | BLUE | RED (A) | RED (B) |
|---|---|---|---|
| INCOMING IFs 710 | K | B | B |
| OUTGOING IFs 720 | J | K | (K) |

| NODE D | BLUE | RED (A) | RED (B) |
|---|---|---|---|
| INCOMING IFs 710 | I | C | C |
| OUTGOING IFs 720 | E | I | (I) |

LC MEMORY 553

FIG. 7A

FORWARDING TABLES 720

| NODE B | |
|---|---|
| INCOMING IFs 710 | A |
| OUTGOING IFs 720 | C |

| NODE C | |
|---|---|
| INCOMING IFs 710 | B, J |
| OUTGOING IFs 720 | D, (K) |

| NODE D | |
|---|---|
| INCOMING IFs 710 | C, I |
| OUTGOING IFs 720 | E |

LC MEMORY 553

ENHANCEMENTS TO PIM FAST RE-ROUTE WITH UPSTREAM ACTIVATION PACKETS

CROSS-REFERENCES TO RELATED APPLICATIONS

The present patent application is a continuation of application Ser. No. 13/486,651, filed Jun. 1, 2012, which was related to an application entitled "ENHANCEMENTS TO PIM FAST RE-ROUTE WITH DOWNSTREAM NOTIFICATION PACKETS" and an application entitled "INCREASING FAILURE COVERAGE OF MOFRR WITH DATAPLANE NOTIFICATIONS", both of which were filed on Jun. 1, 2012.

FIELD

Embodiments of the invention relate to the field of network operations; and more specifically, to routing operations in a multicast communication network.

BACKGROUND

Protocol Independent Multicast Sparse Mode (PIM-SM) (see, IETF RFC4601 of August 2006) is a well known and commonly adopted protocol for constructing and maintaining multicast trees in Internet Protocol (IP) multicast communication networks. In order to distribute multicast content to recipient nodes (hereinafter also referred to as "destinations") of the multicast communication network, PIM-SM uses a single multicast tree. A single multicast tree lacks redundancy for re-routing multicast traffic in case of a network failure.

PIM-SM is commonly used nowadays for constructing multicast paths for real-time traffic (e.g., for Internet Protocol TV (IPTV)). However, because PIM-SM strongly depends on unicast routing, in case of a network failure multicast recovery needs to wait until unicast routing has recovered. Thus, failure reaction for PIM-SM is relatively slow and is, therefore, a serious drawback for real-time applications. In order to overcome this drawback, IETF RFC5714 of January 2010 proposes an Internet Protocol (IP) fast re-route mechanism the uses a secondary path for an incoming multicast stream of a network node, thereby providing an immediate alternative path should the network node lose its connection with its primary upstream neighbor node. However, the proposed approach does not provide an efficient failure detection technique and does not handle all of the possible failure scenarios. Moreover, the proposed approach is a "live-live" protection technique, which means that the "secondary" traffic is always present even in a failure free situation. This secondary traffic can cause significant extra load in a multicast network.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 4A illustrates a collection of rules followed by the network nodes of a multicast communication network according to one embodiment of the invention.

FIG. 4B is a flow diagram illustrating an embodiment of a method for processing a notification packet.

FIGS. 7A and 7B illustrate embodiments of a forwarding table stored in a network node according to MRT and MoFRR, respectively.

SUMMARY

Figure 1A:
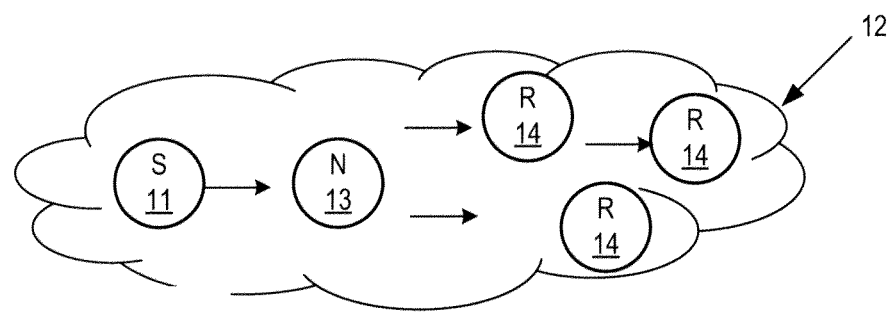
FIGS. 1A and 1B illustrate examples of multicast communication networks.

The embodiments include a method performed by a network node. The method includes detecting a loss of connection at an incoming interface to an upstream neighbor of the network node, where the network node is in a multicast communication network that includes a multicast tree to provide connectivity from a common source node to one or more multicast recipient nodes. The multicast communication network further includes a set of one or more secondary paths to provide redundancy to the multicast tree, and sending a notification packet downstream toward the one or more multicast recipient nodes when the network node cannot re-route the multicast data traffic to allow the multicast data traffic to be received by the multicast recipient nodes, wherein the notification packet causes one or more downstream nodes to switch multicast reception to one or more of the set of one or more secondary paths to re-route the multicast data traffic.

The embodiments further include a network node including a memory configured to store forwarding information for multicast data traffic, wherein the network node is in a multicast communication network that includes a multicast tree to provide connectivity from a common source node to one or more multicast recipient nodes, the multicast communication network further including a set of one or more secondary paths to provide redundancy to the multicast tree, receiver circuitry configured to receive the multicast data traffic, one or more processors coupled to the memory and the receiver circuitry, the one or more processors configured to detect a loss of connection at an incoming interface to an upstream neighbor of the network node, and transmitter circuitry coupled to the one or more processors configured to send a notification packet downstream toward the one or more multicast recipient nodes when the network node cannot re-route the multicast data traffic to allow the multicast data traffic to be received by the multicast recipient nodes, wherein the notification packet causes one or more downstream nodes to switch multicast reception to one or more of the set of one or more secondary paths to re-route the multicast data traffic.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide enhancements to the IP fast re-routing techniques based on PIM-SM. When a network failure occurs, multicast data traffic is re-routed via one or more redundant secondary paths. These secondary paths are pre-computed prior to the failure and forwarding information along the primary and secondary paths is stored in the dataplane of network nodes. Thus, upon detection of a failure, the re-routing can be performed with high speed without waiting for routing convergence in the control plane. Embodiments of the invention also provide enhancements to the speed of failure detection and the efficiency of bandwidth usage as will be described in detail below.

Before describing the embodiments of the invention, it is helpful to understand how a network node joins a multicast group according to PIM-SM. In PIM-SM, a network node uses unicast forwarding messages for joining or leaving a multicast group. In order to join a multicast group, the network node sends a JOIN message in upstream direction of the multicast tree to a common source node (the term "common source node" hereinafter refers to a multicast source node or a rendezvous point in the case of a shared tree). The JOIN message is routed along a path of the multicast tree determined by Multicast Routing Information Base (MRIB) tables. The paths listed in these tables are usually derived directly from unicast routing tables, but they could also be derived differently. Similarly, a network node wanting to leave a multicast group sends a PRUNE packet up the multicast tree to the common source network node.

The MRIB tables are used to determine next-hop neighbors to which the JOIN message is sent next. The JOIN message is routed and processed on a hop-by-hop basis until a network node already receiving the multicast content is reached. All network nodes along this hop-by-hop path process the JOIN message and install or update corresponding multicast routing state information; e.g., by adding the incoming interface via which the JOIN message was received to an outgoing interface list of the multicast. For example, if a node X receives a JOIN message via an incoming interface to node Y, node X will add node Y to the list of outgoing interfaces for the multicast. Multicast content are routed to network nodes in a direction reversed to the direction in which the JOIN messages were received.

Multicast only Fast Re-Route (MoFRR) is an IP fast re-route mechanism, where a network node joins a multicast group via more than one path. Joining a multicast group involves transmitting a JOIN message from the node towards a source on a primary path and another JOIN message from the node towards the source on a secondary path. Should a dual-joining node loses its connection on the primary path, the node has an instantly available secondary path to which it can switch.

According to MoFRR, each dual-joining node has a primary upstream multicast hop (UMH) on the primary path and a secondary UMH on the secondary path. Each UMH is the node's previous-hop neighbor upstream from the node on the path toward a MultiCast Ingress node (MCI). An MCI is the node from which the multicast stream enters the current transport technology (e.g., PIM) domain, and, therefore, the MCI can be regarded as the multicast source for the current domain. In the description herein, the term "MCI" is used synonymously with a multicast source node. It is understood that embodiments of the invention are applicable to scenarios where an MCI is different from a multicast source node in a general sense; e.g., when the MCI receives multicast data from the multicast source node that is located in a different transport technology domain.

According to MoFRR, a dual-joining node's (J) secondary UMH can be chosen from a list of candidate nodes (i.e., previous-hop upstream nodes), which come from either node J's Equal Cost Multipath (ECMP) or Loop Free Alternate (LFA) neighbors on the paths towards the MCI. A node N is node J's ECMP neighbor if the node can be reached from node J with the same cost as the cost for node J to reach the primary UMH. A node N is node J's LFA neighbor if one of the LFA criteria specified in IETF RFC5289 (September 2008) or the non-ECMP mode conditions for MoFRR described in draft-karan-mofrr-02 (March 2012) is satisfied.

Fast Re-Route with Maximally Redundant Trees (MRT) is another IP fast re-route mechanism, which provides two maximally redundant trees for each destination node. By convention these two trees are called the blue (primary) and red (secondary) trees. If a pair of maximally redundant trees is computed rooted at each node, all the nodes remain reachable along one of the trees in the case of a single link or node failure. Thus, a node can dual-join both the red and the blue trees, and can switch from one tree to another when a single link/node fails.

Both MoFRR and MRT implement a live-live multicast protection technique, where a dual-joining node receives the same multicast stream from both the primary and secondary paths. The live-live multicast protection technique incurs double bandwidth consumption in a failure-free scenario, as the network traffic continuously consumes bandwidth on both primary and secondary paths.

To prevent duplicate packets being forwarding to the end user, a dual-joining node only accepts packets from one of the UMHs at a time in a network operating in the live-live protection mode. Which UMH is preferred is a local decision that can be based on Interior Gateway Protocol (IGP) reachability, link status, Bidirectional Forwarding Detection (BFD), traffic flow, etc. When no failure is detected in the network, receipt of duplicated packets can be prevented by blocking the incoming interface to the less-preferred UMH; i.e., packets received from this incoming interface are not forwarded on the multicast tree. If, however, the preferred UMH fails, the incoming interface to the less-preferred UMH can be unblocked to allow the traffic to continue downstream.

In the description herein, the term "upstream" refers to the direction along the paths toward the MCI, and the term "downstream" refers to the direction along the paths away from the MCI. Further, a "neighboring node" is a node one hop away from a current node. A "previous hop" is an upstream neighboring node of a current node, and a "next hop" is a downstream neighboring node of a current node. A "branch node" is a node coupled to more than one path going downstream; a "merge node" is a node coupled to more than one path coming from upstream.

Further, the terms "link," "interface" or "neighbor" can mean "physical" or "virtual" link, interface or neighbor. A "physical" link means a direction connection between two nodes. A physical interface or neighbor means an interface/node coupling to another interface/node via a physical link. A "virtual" link can be a lower-layer tunnel or a complex network between two nodes. A virtual interface/node means an interface/node coupling to another interface/node via a virtual link. For example, two IP routers connected via a complex Ethernet network are "virtual neighbors" at the IP level.

Embodiments of the invention provide a fast re-route mechanism based on PIM-SM that is more bandwidth-efficient and faster-reacting to a network failure than existing techniques that are based on MoFRR and MRT. With respect to bandwidth efficiency, embodiments of the invention provide a live-standby mode in which the backup (secondary) paths are on standby until detection of a failure. The standby paths do not carry multicast data packets when there is no failure in the network, thereby reducing the consumption of network bandwidth. In one embodiment, the standby paths are activated when an upstream activation packet (UAP) is received at a branching point of the network where the multicast flow is blocked. With respect to the speed of failure reaction, embodiments of the invention provide a downstream fast notification packet (DFNP) that is generated and processed in the dataplane of a network node when the network node detects a failure. The use of DFNP improves the speed and reliability for reacting to non-local failures (i.e., remote failures, or equivalently, failures that have occurred at a node or link more than one hop away). The UAP and/or the DFNP can be used in a multicast network that supports either MRT or MoFRR.

FIG. 1A illustrates a multicast communication network 12 that includes multiple network nodes ("nodes"). The multicast communication network 12 is an operator's network. A common source node (e.g., node S 11) sends multicast data to the members of its multicast group via a multicast tree topology. The common source node may be the MCI or a branch node of a multicast group. Multicast recipient nodes (e.g., node R 14), which are also referred to as MultiCast Egress node (MCE), are the nodes that are coupled to subscribers of the multicast, or domain egress nodes that are coupled to neighboring domains where there are subscribers of the multicast. The leaf nodes of the multicast tree are typically MCEs. Between the common source node and the leaf nodes of the multicast tree are a number of interior nodes (e.g., node N 13). Multicast data flows downstream from the common source node to the leaf nodes via the interior nodes. In one embodiment, one or more of the interior nodes may also be MCEs.

Figure 1B:
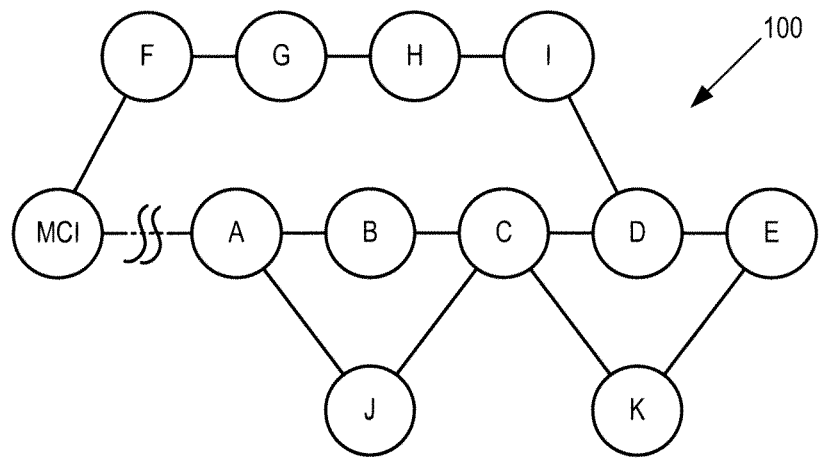

FIG. 1B illustrates an example of a network configuration for a multicast communication network 100. One or more nodes may be omitted from FIG. 1B between the MCI and node A. The multicast communication network 100 will be used as an example network in the following description.

Figure 2A:
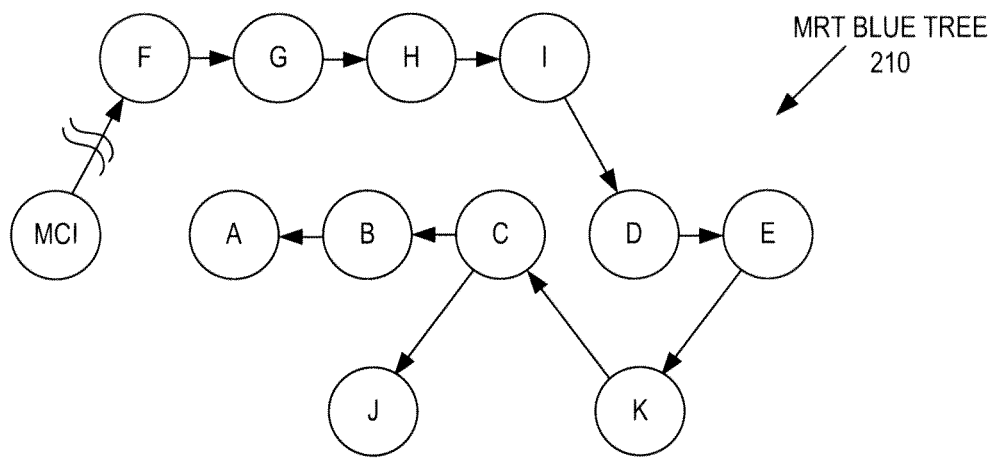
FIGS. 2A and 2B illustrate examples of two multicast redundant trees provided by MRT.
Figure 2B:
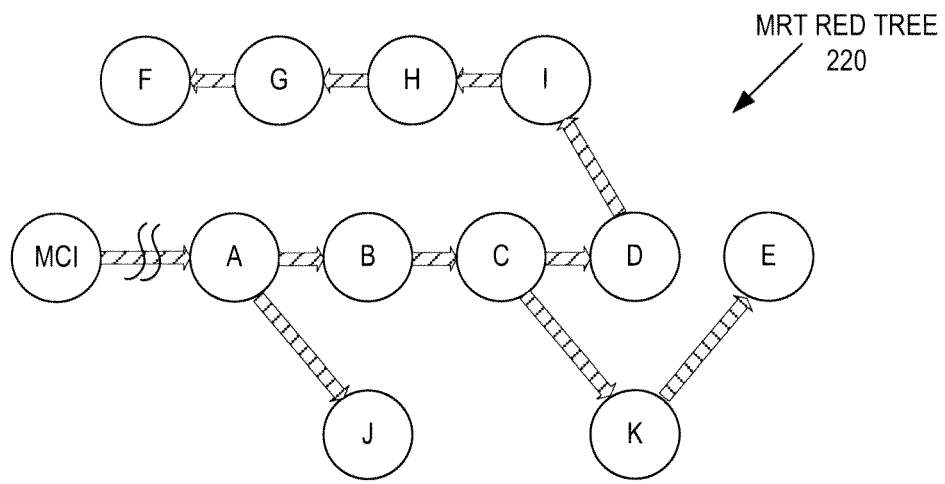

FIGS. 2A and 2B illustrate an example of MRT multicast trees (a blue tree 210 and a red tree 220) configured based on the multicast communication network 100 of FIG. 1. Both the blue tree 210 and the red tree 220 are directed trees. The blue tree 210 of FIG. 2A can be designated as a primary multicast tree. Each thin arrow in the blue tree 210 indicates a primary path or a portion thereof between the MCI and a given node. The red tree 220 of FIG. 2B can be designated as a secondary multicast tree. Each thick arrow in red tree 220 indicates a secondary path or a portion thereof between the MCI and a given node. In a scenario where the "live-live" protection mode is implemented, both the blue tree 210 and the red tree 220 consume bandwidth even when there is no failure in the network. The thick arrows in the red tree 220 indicate bandwidth consumption that is superfluous when there is no failure in the network. According to embodiments of the invention to be described in detail later, the MRT multicast trees may operate in a "live-standby" mode where the red tree 220 consumes no bandwidth until a failure of a node/link is detected.

Figure 3A:
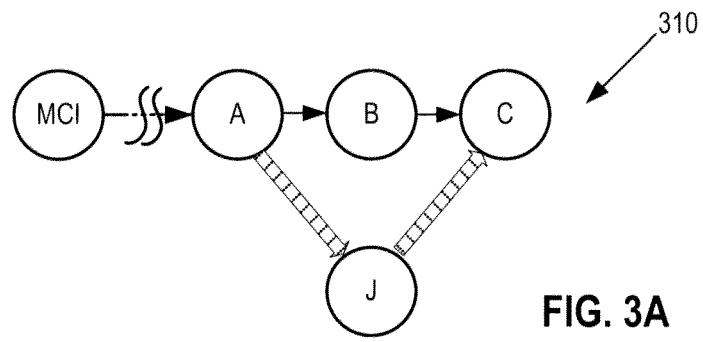
FIGS. 3A-3C illustrate examples of a multicast tree with redundant secondary paths provided by MoFRR.
Figure 3B:
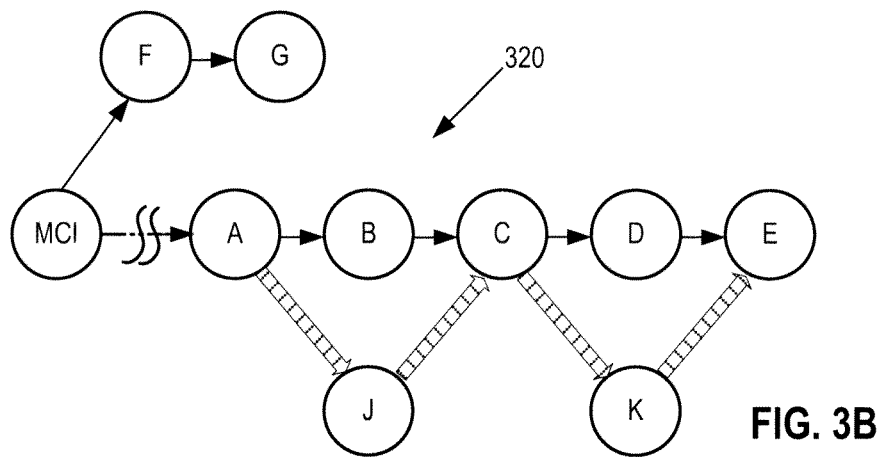
Figure 3C:
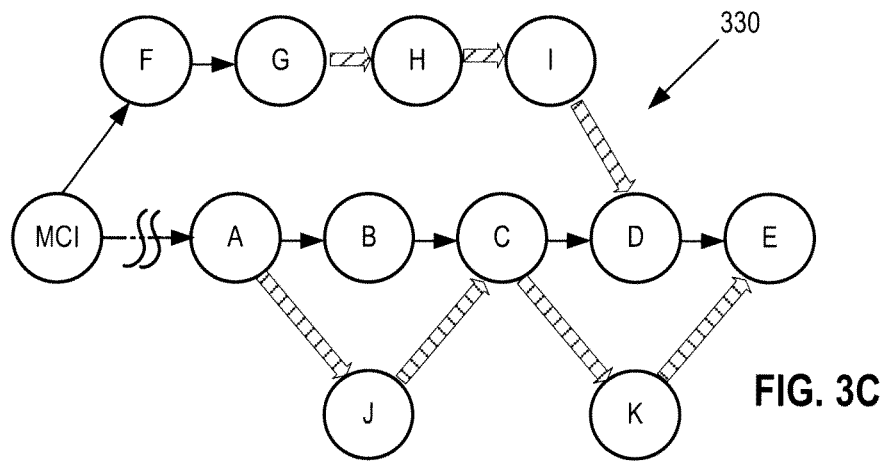

FIGS. 3A-3C illustrate examples of network segments supporting MoFRR. FIG. 3A illustrates an example of a network segment 310 in the multicast communication network 100 of FIG. 1. Assume that node C is the only MCE in the network segment 310. The top thin lines connecting MCI→A→B→C form a primary multicast tree defined by PIM-SM. Each link in this multicast tree represents a primary path. The thick lines connecting A→J→C represent a secondary backup path added by MoFRR for node C. Thus, node C is a dual-joining node in this example. In the "live-live" protection mode, these thick lines represent superfluous bandwidth usage when no failure is presented in the network. In the "live-standby" mode the thick line consumes no bandwidth. MoFRR does not necessarily provide a backup path for every node; for example, there is no protection for the failure of node A.

FIG. 3B illustrates another example of a network segment 320 in the multicast communication network 100 of FIG. 1. Assume that nodes C, E and G are the MCEs in the network segment 320. The top thin lines connecting MCI→A→B→C→D→E and MCI→F→G form a multicast tree defined by PIM-SM. The thick lines connecting to and from nodes J and K represent secondary backup paths added by MoFRR for nodes C and E. Thus, nodes C and E are both dual-joining nodes in this example. In the "live-live" protection mode, these thick lines represent superfluous bandwidth usage when no failure is presented in the network. In the "live-standby" mode the thick line consumes no bandwidth. In the network segment 320, MoFRR provides no or insufficient protection for the failure of nodes A, C or F.

FIG. 3C illustrates yet another example of a network segment 330 in the multicast communication network 100 of FIG. 1, where nodes C, E and G are the MCEs for a multicast stream. In this example, MoFRR provides protection for node D in addition to nodes C and E. The thick lines connecting from node G to node D represent a secondary backup path added by MoFRR for node D. Thus, in this example, nodes C, D and E are dual-joining nodes. In the "live-live" protection mode, these thick lines represent superfluous bandwidth usage when no failure is presented in the network. In the "live-standby" mode the thick line consumes no bandwidth. However, in FIG. 3C, there is still no or insufficient protection for the failure of node A or F.

In the examples above, it can be seen that each dual-joining node has a primary UMH and a secondary UMH. For embodiments based on MoFRR, each dual-joining node selects its secondary UMH based on ECMP or LFA. For embodiments based on MRT, each dual-joining node selects its secondary UMH based on the redundant trees (e.g., the blue tree and the red tree). For example, in FIGS. 2A and 2B, node D's primary UMH is node I and secondary UMH is node C, as node I is on node D's primary path from the MCI and node C is on node D's secondary path from the MCI. In the example of FIG. 3C, node C's primary path from the MCI is MCI→A→B→C and its secondary path is MCI→A→J→C. Thus, node C's primary UMH is node B and secondary UMH is node J. Node B has node A as its primary UMH but does not have a secondary UMH.

In one embodiment, when a node detects a local failure (which may be caused by a failure of its primary UMH or a link connecting to the primary UMH), the node originates a DFNP to all the downstream branches connecting to downstream nodes in the multicast group. The DFNPs can be used for multicast networks that are based on either MRT or MoFRR. For embodiments based on MoFRR, the downstream branches include all of the links on the primary paths and secondary paths leading to the downstream nodes. For embodiments based on MRT, the downstream branches include all of the branches leading to the downstream nodes on that tree where the failure was detected. The DFNP originating node is a failure-detecting node that has no failure-free secondary path to which it can fall back. If the failure-detecting node has an available secondary path available, it can use the secondary path to receive multicast data and no DFNP is generated. When a DFNP is generated, the downstream node that has an available secondary path can be triggered by the DFNP to make a switch-over to the secondary path.

The DFNPs can be generated in the dataplane, using only the forwarding information available in the dataplane without inputs from the control plane. The DFNPs can also be processed in the dataplane when they are received. All of the information necessary for sending and receiving a DFNP is available in the dataplane prior to the occurrence of a network failure. The dataplane-only approach significantly reduces the reaction time when a failure occurs. In one embodiment, the origination and processing of DFNPs can be performed within one or more line cards in the dataplane; updates to the control plane (e.g., the routing tables) can be performed moments later without impacting the failure recovery in real time.

If a failure occurs in a non-local upstream location, a dual-joining node needs a fast and reliable mechanism to detect the upstream failure. For embodiments based on MoFRR, a dual-joining node also needs to learn that other upstream nodes cannot circumvent the failure. Existing methods based on traffic monitoring are limited in scope and work best with a steady state packet flow. For example, if there is constant heavy multicast traffic in the network, an interruption in the traffic flow can serve as an indicator of failure. By contrast, DFNPs are independently of the state of packet flows. A DFNP is an indicator of a non-local failure and can trigger the unblocking of a secondary backup path.

FIG. 4A illustrates an embodiment of the rules followed by each node downstream from the DFNP-originating node. In one embodiment, the rules may be stored in the dataplane circuitry of each network node, such as the network node to be described below in FIGS. 5A and 5B.

(R1) (block 411) If a node receives a DFNP from its primary UMH and has a failure-free secondary path (e.g., receiving no DFNP from its secondary UMH or detecting no failure at the connection to the secondary UMH), the node is a repair node. Upon receiving a DFNP, this repair node is to unblock the secondary path to its secondary UMH. The repair node does not forward the DFNP further downstream.

(R2) (block 412) If a node receives a DFNP from its primary UMH but does not have a secondary UMH, the node is not a repair node. Upon receiving a DFNP, this node is to forward the DFNP to all of its downstream nodes. For embodiments based on MoFRR, the downstream nodes include all the nodes that are on the branches of the primary and secondary paths further downstream. For embodiments based on MRT, the downstream nodes include all of the nodes on the downstream branches on that tree where the failure was detected.

(R3) (block 413) If a node receives two DFNPs—one from its primary UMH and the other from its secondary UMH, this node is also not a repair node. Receiving two DFNPs from respective UMHs is an indication that both of its primary path and secondary path are faulty. Upon receiving the two DFNPs, the node is to forward one of the DFNPs to all of the downstream nodes (as in R2). The other DFNP can be discarded (equivalent to "not forwarded"). In a scenario, the node upon receiving the DFNP from its primary path can wait for a predetermined amount of time to see if it will receive another DFNP from its secondary path. If another DFNP is received from the secondary path, the node does not need to unblock the secondary path because the unblocking cannot remedy the failure. In another scenario, the node upon receiving the DFNP from its primary path can unblock its secondary path immediately and discard the received DFNP. If the node subsequently receives no multicast data traffic but instead receives another DFNP from the secondary UMH, the node will forward this other DFNP to all of its downstream nodes.

(R4) (block 414) A DFNP received only from the secondary UMH of a node is to be discarded.

The MoFRR example of FIG. 3C can be used to illustrate an application of the above rules. If node A fails, nodes B and J will both detect the failure locally (e.g., at their respective incoming interfaces) and each originates a DFNP. Both DFNPs are sent downstream towards node C. Node C is not a repair node because it will receive two DFNPs from its primary UMH (node B) and its secondary UMH (node J). Because node C is not a repair node it will forward one of the DFNPs towards K and D (observing rule R3). Node K does not have a secondary UMH for the multicast tree, so it will send the DFNP downstream towards node E (observing rule R2). Node D has a working secondary UMH (node I), so node D is the repair node (applying rule R1). Node E applies rule R4. As a result, subscribers sitting at or downstream from nodes D and E will continue receiving the multicast traffic.

For embodiments based on MRT, a repair node is a node that not only has a failure-free secondary path in the secondary tree, but also has the ability to translate the headers of multicast packets from the primary tree to the secondary tree for its downstream nodes. In some embodiments based on MRT, multicast packets carry a tree ID in their headers to identify the tree on which the packets traverse. In one scenario (I), all of the nodes can translate packet headers from one tree to another for other nodes. Thus, a failure-detecting node may switch multicast reception to the secondary tree and translate the packets for its downstream nodes on the primary tree. In this scenario (I), no DFNP is necessary. In another scenario (II), some network nodes (e.g., the interior nodes) may able to translate packet headers from one tree to the other only for its subscribers (if any), but not for other nodes. Thus, a failure-detecting node that is an interior node may switch multicast reception to the secondary tree and send a DFNP to it downstream nodes on the primary tree, such that these downstream nodes can also switch multicast reception to the secondary tree. In the description herein for MRT, the term "primary/secondary tree" and "primary/secondary path" are used interchangeably.

For example, assume that the blue tree 210 of FIG. 2A is the primary tree, the red tree 220 of FIG. 2B is the secondary tree, and a failure occurs on the link connecting node I to node D. When the network operates in the live-live mode, both trees 210 and 220 carry multicast data traffic, but each node blocks its incoming interface to the secondary path (on the red tree 220). No UAP is generated when a failure is detected, because a node can simply unblock its incoming interface to its secondary UMH to receive multicast traffic. In scenario (I) where the interior nodes can translate from one tree to the other for other nodes, upon detecting the failure of its primary UMH, node D can simply unblock its secondary path from node C, and replicate and translate traffic from its secondary UMH (node C) onto the primary tree downstream (e.g., for nodes E, K, C, J, B and A). In this case, node D will not generate a DFNP.

In scenario (II) where the interior nodes cannot translate from one tree to the other for other nodes, node D sends a DFNP downstream on the primary tree to nodes E, K, C, J, B and A upon detecting the failure. The DFNP is used by each of these nodes to unblock its incoming interface to the secondary UMH. For example, node K upon receiving the DFNP can immediately unblocks the secondary UMH (i.e., the incoming interface from node C) and start translating the multicast data packets for its subscribers.

FIG. 4B is a flow diagram illustrating an embodiment of a method 400 for processing a received DFNP. When a network node receives a DFNP (block 410), it determines whether the DFNP is received from its primary UMH (block 420). If the DFNP is received from the secondary UMH only, the network node discards the DFNP (block 430). If the DFNP is received from the primary UMH, the network node determines whether it also receives a DFNP from its secondary UMH (block 440). If the network node receives two DFNP from two UMHs, it forwards only one DFNP further downstream (block 450). If the network node receives the DFNP from its primary UMH only, the network node determines whether it has a failure-free secondary path to the MCI (block 460). If the network node does not have such a failure-free secondary path, it forwards the DFNP further downstream (block 470). A network node may determine whether it has a failure-free secondary path to the MCI based on local detection of its connection to the secondary UMH, or based on whether the node receives a DFNP from the secondary UMH indicating a non-local failure as determined at block 440.

If the network node has a failure-free secondary path (block 460), it switches multicast reception to the secondary UMH (block 480) and does not forward the DFNP any further (block 490). The network node may switch multicast reception by unblocking its incoming interface to the secondary UMH. For an embodiment of the network based on MRT, it is also determined subsequent to block 480 whether the network node is able to translate multicast packets from one tree to another for its downstream nodes on the primary tree (block 485). If the network node cannot translate multicast packets for other nodes, the network node forwards the DFNP further downstream (block 470). If the network node can translate multicast packets for other nodes, it can start translating the packets and does not forward the DFNP any further (block 490).

The decision on whether to forward a DFNP can be summarized as follows. A node does not forward a DFNP further downstream if it receives the DFNP only from its secondary path, or if it receives the DFNP from its primary path and its secondary path is potentially working (e.g., the "down status" of the secondary UMH is not yet confirmed by local detection or by a DFNP received from the secondary UMH). A node forwards a DFNP further downstream if the node receives the DFNP from its primary path and no secondary path exists for the node, or if the node receives the DFNP from one of its primary path and secondary path and previously another DFNP was received from the other of its primary path and secondary path.

In some embodiments where the network operates the live-standby mode, the network node may send an upstream activation packet (UAP) along the secondary path (block 480), such that an upstream node which blocks the multicast data flow to the secondary path can unblock its corresponding outgoing interface to activate the secondary path. More details about UAP will be described below in connection with the live-standby mode operations.

A DFNP allows a node downstream from a failure to unambiguously identify the multicast tree impacted by the failure. In one embodiment, a DFNP includes a multicast source address and a multicast group address (e.g., in the IP source/destination address fields) identifying the multicast group or multicast tree.

A DFNP is easy to recognize by recipient nodes. In one embodiment, either a special IP protocol value (e.g., in the IP header) or a specially allocated User Datagram Protocol (UDP) port number can be used for distinguishing DFNPs from regular data packets in the multicast stream. If a special UDP port number is used, the IP protocol field may be set to an easily recognizable value, such as "103" corresponding to PIM. In some embodiments for troubleshooting purposes, the payload may contain the ID of the node originating the DFNP, and may also contain the ID of the node to which connectivity was lost and/or the link ID on which the connectivity was lost. In some embodiments, a DFNP may also include a timestamp indicating the time of its origination.

Figure 5A:
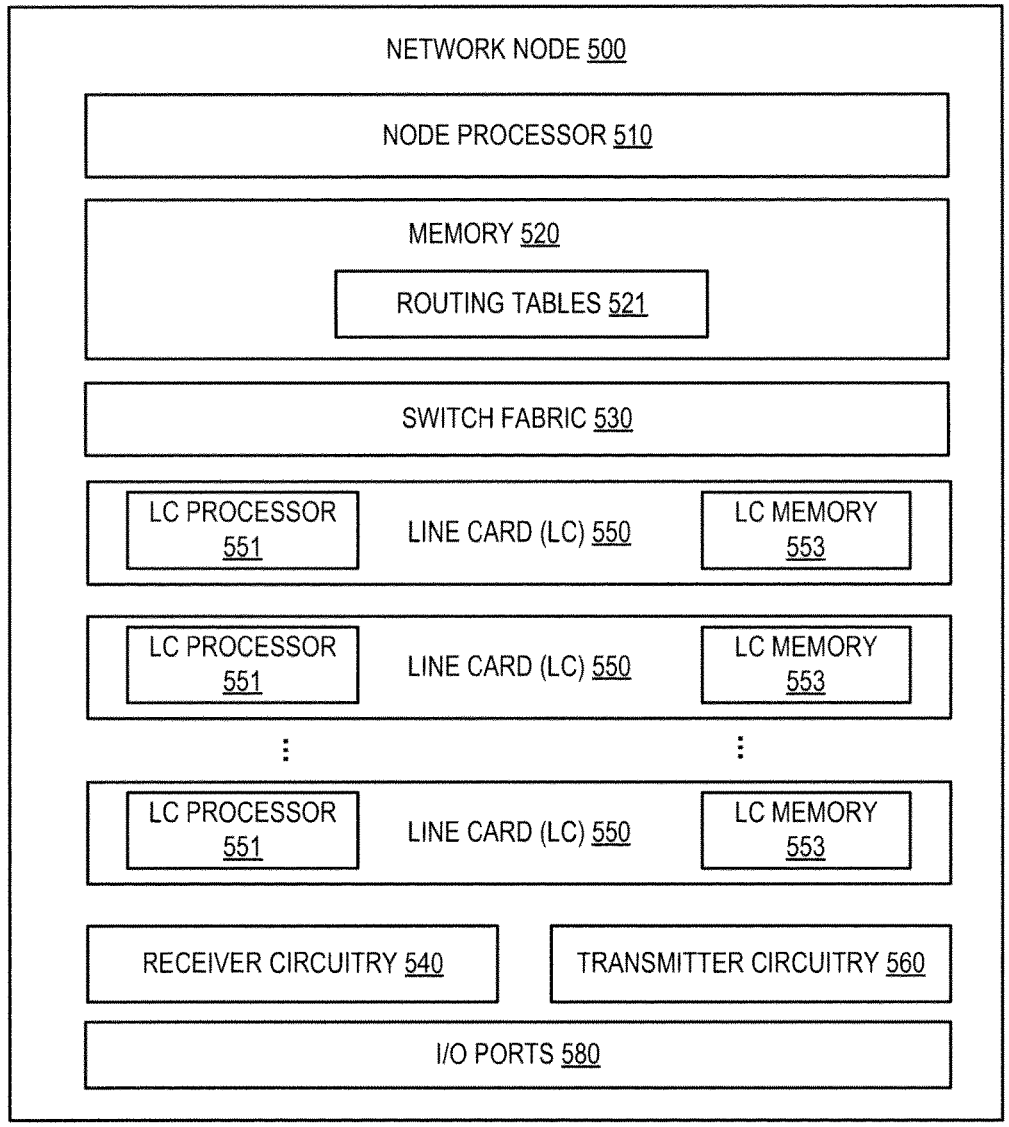
FIG. 5A is a block diagram illustrating an embodiment of a network node.
Figure 5B:
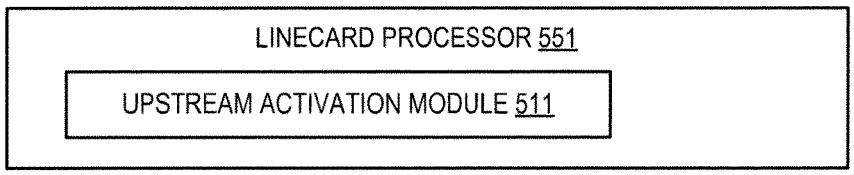
FIG. 5B is a block diagram illustrating an embodiment of a line card processor.

FIG. 5A illustrates an example of a network node 500 that may be used to implement an embodiment of the invention. The network node 500 may be any of the network nodes A-K described above in FIGS. 2A-B and 3A-C. As shown in FIG. 5, the network node 500 includes a dataplane, which further includes a switching fabric 530, a number of line cards 550 and multiple I/O ports 580. Each line card 550 includes a line card processor 551 to perform functions on the data received over the I/O ports 580. As shown in FIG. 5B, an embodiment of the line card processor 551 includes an upstream notification module 511 configured to generate and process UFNPs. The dataplane also includes one or more forwarding tables 553 for each multicast group to which the network node 500 is a member. The forwarding tables stores forwarding information for tracking the network node's upstream neighbors (e.g., the UMHs), downstream neighbors and the interfaces to these neighbors. The switching fabric 230 switches data between the line cards 550.

The network node 500 also includes a control plane. The control plane further includes one or more node processors 510 containing control logic configured to handle the routing and management of the network traffic. The control plane also includes a memory 520, which stores one or more routing tables 521, among other things, to maintain the routing information of the network. It is understood that the network node 500 may include additional components and information than what is described above.

Figure 6:
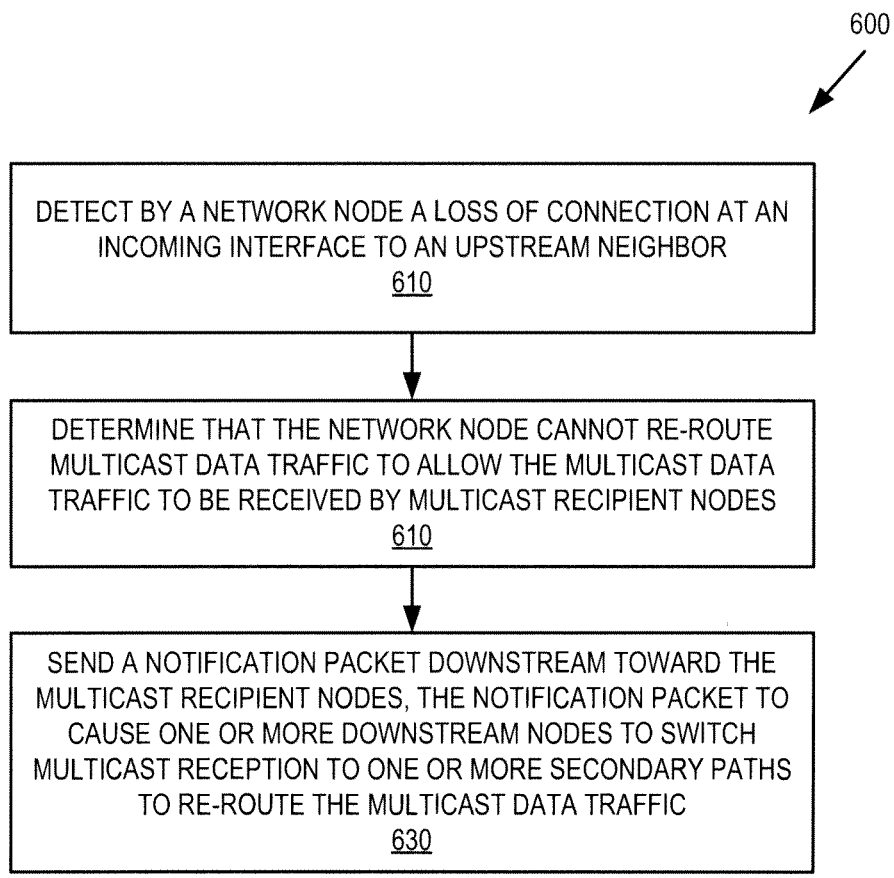
FIG. 6 is a flow diagram illustrating an embodiment of a method for generating and sending a notification packet downstream to re-route multicast data traffic.

FIG. 6 illustrates an embodiment of a method 600 for providing multicast fast re-route in case of a failure. In one embodiment, the method 600 can be performed by a network node in a multicast communication network, such as the network node 500 of FIG. 5A.

The method 600 begins when a network node detects a loss of connection to an upstream neighbor (block 610). In one embodiment, the upstream neighbor is the network node's primary UMH for a multicast group. The failure-detecting node generates a notification packet if it determines that it cannot re-route the multicast data traffic to allow the multicast data traffic to be received by the recipient nodes of the multicast group (block 620). In an embodiment based on MRT (scenario (I) described above), the re-routing may involve switching the multicast reception to the red tree by the failure-detecting node and translating the multicast packets for all of its downstream nodes in the blue tree. In an embodiment based on MRT (scenario (II) described above), the re-routing may involve switching the multicast reception to the red tree by the failure-detecting node and by some or all of its downstream nodes in the blue tree. In an embodiment based on MoFRR, the re-routing may involve switching the multicast reception to the secondary UMH by a merge node downstream from the failure that has a working secondary path to the MCI. Thus, in response to the determination at block 620, the node generates and sends a notification packet (e.g., a DFNP) downstream toward the recipient nodes of the multicast group (block 630). The notification packet causes one or more downstream nodes to switch multicast reception to one or more of the redundant secondary paths in the multicast communication network to thereby re-route the multicast data traffic.

In one embodiment, multicast reception may be switched from a primary path to a secondary path by a node at the receiving side; e.g., by unblocking the node's incoming interface to the secondary UMH. In another embodiment, multicast reception may be switched from a primary path to a secondary path by a node at the transmitting side; e.g., by unblocking the node's outgoing interface to the downstream neighbors on the secondary path. A branch node (at the transmitting side) that operates in a live-live mode has unblocked outgoing interfaces to its primary and secondary downstream neighbors, causing duplicated multicast data traffic to flow on the secondary path. The corresponding merge node (at the receiving side) has a blocked incoming interface to the secondary UMH to prevent receipt of the duplicated traffic as long as there is no failure. By contrast, according to embodiments of the invention, a branch node that operates in a live-standby mode has blocked outgoing interface to the secondary path while the corresponding merge node has unblocked incoming interface to the secondary path. As a result, multicast duplication is avoided and multicast bandwidth consumption is optimized.

FIG. 7A and FIG. 7B illustrates how a number of network nodes may block their interfaces in a live-standby mode according to embodiments of the invention. FIG. 7A illustrates an embodiment of the forwarding tables 553 of FIG. 5A that are stored in the dataplane of nodes B, C and D of FIGS. 2A (blue tree) and 2B (red tree), and FIG. 7B illustrates an embodiment of the forwarding tables 553 of the same nodes of FIG. 3C. For each multicast group, the forwarding tables 553 in each network node store a list of incoming interfaces (incoming IFs) 710 to identify the node's upstream neighbor(s) (i.e., UMH(s)), and a list of outgoing interfaces (outgoing IFs) 720 to identify the node's downstream neighbor(s) in that multicast group. Some of the interfaces may be blocked (indicated by a pair of parentheses). In some embodiments, a flag associated with a blocked interface may be set to indicate its blocked status. In the embodiment based on MRT as shown in FIG. 7A, assume that blue tree is the primary tree and the red tree is the secondary tree. In a failure-free scenario, all of the blue tree interfaces are unblocked. Two options (red tree (A) and red tree (B)) are shown for a network operating in the live-standby mode. For the red tree (A) option in a failure-free scenario, all of the interfaces in the red tree are unblocked as only the MCI blocks its outgoing interfaces to the red tree. For the red tree (B) option in a failure-free scenario, all of the nodes have their outgoing interfaces in the red tree blocked. In other embodiments (not shown), the nodes may block both its incoming and outgoing interfaces in the red tree. In the embodiment of a network based on MoFRR and operating in a live-standby mode as shown in FIG. 7B, the outgoing interface of a branching node to a secondary DMH can be blocked to prevent duplicated multicast data packets to be sent on the secondary path. For example, node C's outgoing interface to node K is blocked.

When a failure is detected at an upstream location of a network that operates in the live-live mode, a downstream node can start receiving multicast data by unblocking its incoming interface to the secondary path. However, when a failure is detected in a network that operates in the live-standby mode, a downstream node cannot receive multicast data from a secondary path unless its upstream node unblocks the outgoing interface to the secondary path. The DFNP described above passes failure information to a downstream node that has a working secondary path to the MCI. For the downstream node to start receiving multicast, an upstream node located at the transmitting side of the secondary path needs to unblock its outgoing interface to allow the multicast data to flow on the secondary path.

Embodiments of the invention provide an upstream activation packet (UAP), which is sent on a secondary path upon detection of a failure to explicitly activate traffic on the secondary path. As multicast data traffic is not flowing on these secondary paths when there is no failure, sending the UAPs activates these blocked outgoing interfaces. Thus, a network can keep the secondary paths in the standby mode (i.e., not loaded), thereby decreasing bandwidth consumption significantly (e.g., by as much as 50%).

According to embodiments of the invention that operate in the live-standby mode, a UAP is generated and sent upstream via a secondary path toward the MCI in response to an indication of network failure (e.g., a node or link failure) that has occurred somewhere on the primary path upstream. The UAP can be generated by a node that has a failed primary path to the MCI and a working secondary path to the MCI. More specifically, a UAP originating node is a node that detects or is informed of an upstream failure by any failure detection technique, and is also a node that has a working secondary path toward the MCI. A UAP originating node may be informed of an upstream failure by receiving be a DFNP from its primary path. Alternatively, a UAP originating node may detect a loss of connection at its incoming interface to the primary UMH. In some embodiments, a UAP originating node may detect an upstream failure using any means that is independent of DFNPs. For example, heartbeat signals may be sent at a steady rate from the MCI to the multicast recipient nodes. These signals may be forwarded along the same multicast tree as the multicast data stream. The absence of such a heartbeat indicates the presence of a failure. In some other embodiments, a UAP originating node may detect an upstream failure by monitoring the multicast data traffic on the primary path. In all of the above scenarios, the UAP originating node needs to have a working secondary UMH to which the UAP can be sent. That is, there can be no indication of upstream failure on the secondary path of the UAP originating node; e.g., no DFNP is received from the secondary UMH or no loss of connection to the secondary UMH.

The UAP activates any blocked outgoing interfaces on which it is received. Which outgoing interfaces are blocked or unblocked is dependent on how the secondary paths were built. In the live-standby mode the secondary paths are built with dedicated standby (backup) status. To build a secondary path with the dedicated standby status, in one embodiment, the JOIN request (e.g., a PIM JOIN message) sent by a joining node can be marked with a flag to indicate the standby status (for embodiments based on MRT, the flag may be a tree ID that indicates which one of the trees is being joined). When this request reaches an upstream node in the multicast tree, the upstream node installs an outgoing interface to the secondary path in the dataplane. Depending on the location of the upstream node in the multicast tree, the outgoing interface may be installed with a flag indicating that it is blocked. Packets are not forwarded to a blocked outgoing interface unless an activation packet (e.g., a UAP) activates the interface.

For embodiments of the invention based on MoFRR, only the branch nodes need to keep their outgoing interfaces for the secondary paths blocked. The secondary join request may travel from a merge node upwards through several hops that are not on the primary paths. The secondary-only nodes, however, do not receive packets from the branch node since the outgoing interface of the branch node is blocked. Therefore, these secondary-only nodes need not block their interfaces. The branch node upon receiving a UAP can unblock its outgoing interface to the secondary path and discard the UAP, i.e., does not need to forward it further upstream. For embodiments based on MRT, this branch node is the MCI. For embodiments based on MoFRR, this branch node is not necessary the MCI. For example, if node C (in FIG. 3C) detects a loss of connection at its incoming interface to node B but detects no failure at its incoming interface to node J, node C can send a UAP along the secondary path to the MCI. Node A (the first branch node upstream from node C) intercepts this UAP, unblocks its outgoing interface to node J, and discards the UAP.

For embodiments based on MRT, depending on which outgoing interfaces were blocked when the MRT multicast trees were built, there are two alternative options (A) and (B) for handling the UAP. In a first option (A) where only the MCI keeps the secondary outgoing interfaces blocked (as shown in the red tree option (A) of FIG. 7A), the UAP is processed by the MCI only. The MCI in reaction to the UAP performs one of the following: (A1) unblocks all of the outgoing interfaces on the secondary tree, or (A2) unblocks only that outgoing interface through which the UAP was received. In the first case (A1) the whole secondary tree is activated at once. In the second case (A2), only the branch that is needed for re-routing the multicast is activated. In a second option (B) where all of the nodes in the multicast group block their outgoing interfaces for the secondary tree (as shown in the red tree option (B) of FIG. 7A), each node unblocks the outgoing interface on which the UAP was received while forwarding the UAP towards the MCI. Option (B) has the effect that the only path that is activated is the path on the secondary tree which is needed for re-routing the multicast. By contrast, option (A1) activates a whole secondary tree and option (A2) activates a whole sub-tree. For example, if node C (in FIG. 2B) detects a loss of connection at its incoming interface to node J, node C can send a UAP along the secondary path (i.e., the red tree 220) to the MCI. The UAP causes the MCI (option (A)), or all of the MCI, node A and node B (option (B)) to unblock their outgoing interfaces.

Further, depending on whether an interior node can translate a multicast packet header from one tree to another for other nodes, an interior failure-detecting node may or may not generate a DFNP or UAP. The following describes two scenarios for a MRT-based network operating in the live-standby mode, with the assumption that the blue tree 210 is the primary tree, the red tree 220 is the secondary tree, and a failure occurs on the link connecting node I to node D.

In scenario (1) where interior nodes can translate from one tree to another for other nodes, when node D detects the failure, it has a working secondary path to which it can switch. However, the secondary path is not currently active. Thus, D does not need to send a DFNP, but will need to send a UAP on the secondary path via nodes C, B and A to reach the MCI. This UAP will activate the secondary path for both option (A) (where only the MCI block its outgoing interface to the red tree) and option (B) (where the MCI and nodes C, B and A block their respective outgoing interfaces to the red tree).

In scenario (2) where interior nodes cannot translate from one tree to another for other nodes, node D upon detecting the failure will activate its secondary path by sending an UAP through node C to the MCI. Node D will also send a DFNP downstream along the blue tree to nodes E, K, C, J, B and A. Each node upon receiving the DFNP activates its secondary path by send an UAP upstream along the secondary path. For example, node K after receiving the DFNP from node D, sends a UAP through node C to MCI so that its secondary path receives traffic. By this time, node C may have already activated its interfaces on the red tree by the UAP from node D, so node C will not need to forward the UAP from node K towards the MCI.

In one embodiment, the source IP address of a UAP identifies the node that originates the UAP, and the destination IP destination address identifies the MCI. A UAP is sent on the secondary path in the upstream direction towards the MCI. A UAP can be easily recognizable by the recipient nodes, because it contains a special IP protocol value (in the IP header) or a specially allocated UDP port number. If a special UDP port number is used, the IP protocol field may be set to the value (103) corresponding to PIM. The payload of a UAP contains the multicast source address and the group address of the multicast group for identification. In some embodiments, for troubleshooting purposes the payload of a UAP may contain the ID of the node to which connectivity was lost and/or a link ID on which the connectivity was lost. In some embodiments, a timestamp could also be added to the UAP.

Figure 8:
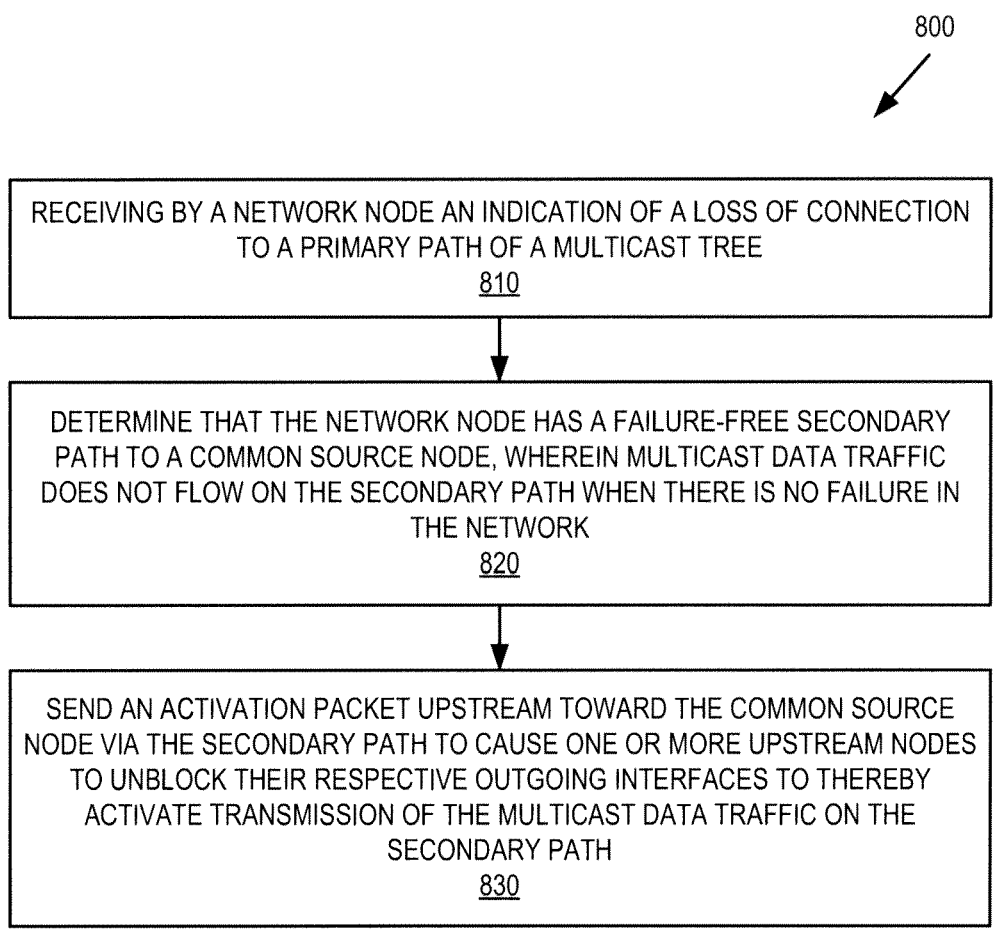
FIG. 8 is a flow diagram illustrating an embodiment of a method for generating and sending an activation packet to activate a secondary path.

FIG. 8 illustrates an embodiment of a method 800 for activating a standby path in case of a failure. In one embodiment, the method 800 can be performed by a network node in a multicast communication network, such as the network node 500 of FIG. 5A.

The method 800 begins when the network node receives an indication of a loss of connection to a primary path of a multicast tree (block 810). The multicast tree is operating in a live-standby mode to reduce bandwidth usage, where multicast data traffic does not flow on the secondary paths when there is no failure in the network. If network node determines that it has a failure-free secondary path to a source node (block 820), it sends an activation packet (e.g., a UAP) upstream toward a common source node via the failure-free secondary path. The UAP actives the flow of the multicast data traffic transmission on the failure-free secondary path, causing one or more upstream nodes to unblock respective one or more outgoing interfaces to thereby activate transmission of the multicast data traffic on the failure-free secondary path (block 830).

The operations of the diagrams of FIGS. 6 and 8 have been described with reference to the exemplary embodiment of FIG. 5A. However, it should be understood that the operations of the diagrams of FIGS. 6 and 8 can be performed by embodiments of the invention other than those discussed with reference to FIG. 5A, and the embodiment discussed with reference to FIG. 5A can perform operations different than those discussed with reference to the diagrams of FIGS. 6 and 8. While the diagrams of FIGS. 6 and 8 show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

As used herein, a network element (e.g., a router, switch, bridge, controller) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a network node, the method comprising:
   detecting, by the network node, a loss of connection at a first incoming interface to an upstream neighbor of the network node, wherein the network node is in a multicast communication network that includes a multicast tree to provide connectivity from a common source node to one or more multicast recipient nodes, the multicast communication network further including a set of one or more secondary paths to provide redundancy to the multicast tree; and
   sending a notification packet downstream toward the one or more multicast recipient nodes in response to determining that the network node cannot re-route the multicast data traffic via a second incoming interface of the network node to allow the multicast data traffic to be received by the multicast recipient nodes, wherein the notification packet causes one or more downstream nodes to switch multicast reception to one or more of the set of one or more secondary paths to re-route the multicast data traffic, where the notification packet is a downstream fast notification packet for protocol independent multicast sparse mode, wherein the notification packet causes a downstream merge node, which has a failure-free secondary path to the common source node, to generate an activation packet when the set of one or more secondary paths are on standby, and to send the activation packet via the failure-free secondary path toward the common source node to cause a recipient node of the activation packet to unblock an outgoing interface for the multicast data traffic and multicast tree.

2. The method of claim 1, wherein the multicast communication network includes a set of dual-joining nodes, each of which is coupled to a primary upstream multicast hop (UMH) on a respective primary path to the common source node and a secondary UMH on a respective secondary path to the common source node, the method further comprising selecting the secondary UMH based on Equal Cost Multi-Path (ECMP), Loop Free Alternate (LFA), or Multicast-Only Fast Re-Route (MoFRR).

3. The method of claim 1, wherein the multicast communication network includes a set of dual-joining nodes, each of which is coupled to a primary upstream multicast hop (UMH) on a respective primary path to the common source node and a secondary UMH on a respective secondary path to the common source node, the method further comprising selecting the secondary UMH based on Maximally Redundant Trees (MRT).

4. The method of claim 1, wherein the notification packet causes a downstream merge node, which has a failure-free secondary path to the common source node, to unblock an incoming interface to the failure-free secondary path.

5. The method of claim 1, wherein the notification packet causes a downstream merge node, which has a failure-free secondary path to the common source node, to generate an activation packet when the set of one or more secondary paths are on standby, and to send the activation packet via the failure-free secondary path toward the common source node to cause a recipient node of the activation packet to unblock an outgoing interface for the multicast data traffic.

6. The method of claim 1, wherein the notification packet is not forwarded by a recipient node of the notification packet further downstream if the notification packet is received from a secondary path of the recipient node, or if the notification packet is received from a primary path of the recipient node and the secondary path is potentially working.

7. The method of claim 1, wherein sending further comprises sending the notification packet to all branches in the multicast tree and the one or more of the set of one or more secondary paths downstream from the network node.

8. The method of claim 1, wherein sending further comprises sending the notification packet downstream along one of two multicast trees on which multicast tree the loss of connection was detected.

9. The method of claim 1, wherein the notification packet includes a multicast source address and a multicast group address for identifying a multicast group to which the multicast data traffic is sent.

10. The method of claim 1, wherein the notification packet is generated based on information stored in one or more line cards of the network node, and wherein the information has been stored in the one or more line cards prior to the loss of connection.

11. The method of claim 1, wherein the notification packet includes a special Internet Protocol (IP) value in an IP header, or a specially allocated User Datagram Protocol (UDP) port number.

12. The method of claim 1, wherein the notification packet includes one or more of the following information: an identifier of the node to which connectivity was lost, an identifier of the link on which the connectivity was lost, and a timestamp indicating when the loss of connection was detected.

13. A network node comprising:
memory configured to store forwarding information for multicast data traffic, wherein the network node is in a multicast communication network that includes a multicast tree to provide connectivity from a common source node to one or more multicast recipient nodes, the multicast communication network further including a set of one or more secondary paths to provide redundancy to the multicast tree;
receiver circuitry configured to receive the multicast data traffic;
one or more processors coupled to the memory and the receiver circuitry, the one or more processors configured to detect a loss of connection at a first incoming interface to an upstream neighbor of the network node; and
transmitter circuitry coupled to the one or more processors configured to send a notification packet downstream toward the one or more multicast recipient nodes in response to determining that the network node cannot re-route the multicast data traffic via a second incoming interface of the network node to allow the multicast data traffic to be received by the multicast recipient nodes, wherein the notification packet causes one or more downstream nodes to switch multicast reception to one or more of the set of one or more secondary paths to re-route the multicast data traffic, where the notification packet is a downstream fast notification packet for protocol independent multicast sparse mode, wherein the notification packet causes a downstream merge node, which has a failure-free secondary path to the common source node, to generate an activation packet when the set of one or more secondary paths are on standby, and to send the activation packet via the failure-free secondary path toward the common source node to cause a recipient node of the activation packet to unblock an outgoing interface for the multicast data traffic and the multicast tree.

14. The network node of claim 13, wherein the multicast communication network includes a set of dual-joining nodes, each of which is coupled to a primary upstream multicast hop (UMH) on a respective primary path to the common source node and a secondary UMH on a respective secondary path to the common source node, wherein the secondary UMH is selected based on Equal Cost MultiPath (ECMP), Loop Free Alternate (LFA), or Multicast-Only Fast Re-Route (MoFRR).

15. The network node of claim 13, wherein the multicast communication network includes a set of dual-joining nodes, each of which is coupled to a primary upstream multicast hop (UMH) on a respective primary path to the common source node and a secondary UMH on a respective secondary path to the common source node, wherein the secondary UMH is selected based on Maximally Redundant Trees (MRT).

16. The network node of claim 13, wherein the notification packet causes a downstream merge node, which has a failure-free secondary path to the common source node, to unblock an incoming interface to the failure-free secondary path.

17. The network node of claim 13, wherein the notification packet is not forwarded by a recipient node of the notification packet further downstream if the notification packet is received from a secondary path of the recipient node, or if the notification packet is received from a primary path of the recipient node and the secondary path is potentially working.

18. The network node of claim 13, wherein the notification packet is forwarded by a recipient node of the notification packet further downstream if the notification packet is received from a primary path of the recipient node and no secondary path exists for the recipient node, or if the notification packet is received from one of the primary path and the secondary path of the recipient node and previously another notification packet was received from the other of the primary path and the secondary path.

19. The network node of claim 13, wherein the transmitter circuitry is configured to send the notification packet to all branches in the multicast tree and the one or more of the set of one or more secondary paths downstream from the network node.

20. The network node of claim 13, wherein the transmitter circuitry is configured to send the notification packet downstream along one of two multicast trees on which multicast tree the loss of connection was detected.

21. The network node of claim 13, wherein the notification packet includes a multicast source address and a multicast group address for identifying a multicast group to which the multicast data traffic is sent.

22. The network node of claim 13, wherein the notification packet is generated based on information stored in one or more line cards of the network node, and wherein the information has been stored in the one or more line cards prior to the loss of connection.

23. The network node of claim 13, wherein the notification packet includes a special Internet Protocol (IP) value in an IP header, or a specially allocated User Datagram Protocol (UDP) port number.

24. The network node of claim 13, wherein the notification packet includes one or more of the following information: an identifier of the node to which connectivity was lost, an identifier of the link on which the connectivity was lost, and a timestamp indicating when the loss of connection was detected.

* * * * *